US012721776B2

(12) United States Patent
Png et al.

(10) Patent No.: US 12,721,776 B2
(45) Date of Patent: Sep. 1, 2026

(54) MOBILE HIGH FREQUENCY CHEST WALL OSCILLATION SYSTEM HAVING AIR PODS

(71) Applicant: Hill-Rom Services PTE. LTD., Singapore (SG)

(72) Inventors: Gee Han Png, Singapore (SG); Yaolong Lou, Singapore (SG); Aaron Alexander Ayu, Singapore (SG); Barry Tay Eng Keong, Singapore (SG); Tom Westfall, Riverside, CA (US); Deny D. Barilea, Singapore (SG)

(73) Assignee: Hill-Rom Services PTE. LTD., Singapore (SG)

( * ) Notice: Subject to any disclaimer, the term of this patent is extended or adjusted under 35 U.S.C. 154(b) by 593 days.

(21) Appl. No.: 18/342,167

(22) Filed: Jun. 27, 2023

(65) Prior Publication Data

US 2024/0033161 A1 Feb. 1, 2024

Related U.S. Application Data

(60) Provisional application No. 63/393,018, filed on Jul. 28, 2022.

(51) Int. Cl.

| | |
|---|---|
| ***A61H 9/00*** | (2006.01) |
| ***A47C 27/00*** | (2006.01) |
| ***A47C 31/00*** | (2006.01) |
| ***B29C 59/00*** | (2006.01) |
| ***B29C 59/16*** | (2006.01) |

(Continued)

(52) U.S. Cl.
CPC ......... *A61H 9/0078* (2013.01); *A47C 27/002* (2013.01); *A47C 31/006* (2013.01); *A61H 9/0007* (2013.01); *B29C 59/005* (2013.01); *B29C 59/16* (2013.01); *A61H 2201/0103* (2013.01); *A61H 2201/1619* (2013.01); *A61H 2201/165* (2013.01); *B29K 2075/00* (2013.01);
(Continued)

(58) Field of Classification Search
CPC ...... A61M 9/00; A61M 9/005; A61M 9/0007; A61M 9/0078; A61M 2201/0103; A61M 2201/1619; A61M 2201/165; A47C 31/006; A47C 27/002; A61F 5/003; A61F 5/012; A61F 5/05816; F15B 15/10; F15B 15/103
USPC ...................................................... 92/89, 106
See application file for complete search history.

(56) References Cited

U.S. PATENT DOCUMENTS 5,769,800 A * 6/1998 Gelfand ................ A61H 31/00
601/44
6,551,450 B1 * 4/2003 Thomas .............. A61H 9/0078
297/284.6

(Continued)

FOREIGN PATENT DOCUMENTS

CN 206651983 U 11/2017
CN 213910283 U 8/2021

(Continued)

OTHER PUBLICATIONS

PCT Search Report for International Application No. PCT/SG2023/050502, mailed Oct. 19, 2023, 15 pages.

*Primary Examiner* — Douglas Y Sul
(74) *Attorney, Agent, or Firm* — Barnes & Thornburg LLP

(57) ABSTRACT

A high-frequency chest wall oscillation (HFCWO) system includes a garment configured to be worn around a chest of a user. At least one fluid pod is housed by the garment and is configured to receive a fluid. The at least one fluid pod includes a housing configured to be pulsated by the fluid.

20 Claims, 10 Drawing Sheets

(51) Int. Cl.
*B29K 75/00* (2006.01)
*B29K 77/00* (2006.01)
*B29L 31/00* (2006.01)

(52) U.S. Cl.
CPC ..... *B29K 2077/00* (2013.01); *B29L 2031/751* (2013.01)

(56) References Cited

U.S. PATENT DOCUMENTS

| | | | | |
|---|---|---|---|---|
| 6,605,050 | B2 | 8/2003 | Hansen | |
| 8,578,939 | B1 * | 11/2013 | Kimani Mwangi | A61F 5/56 128/848 |
| 10,406,063 | B2 | 9/2019 | Mitchell et al. | |
| 11,013,659 | B2 | 5/2021 | Shockley, Jr. et al. | |
| 11,110,028 | B2 | 9/2021 | Huster et al. | |
| 2008/0080793 | A1 * | 4/2008 | Kitou | B60N 2/914 383/3 |
| 2009/0192421 | A1 * | 7/2009 | Huster | A61B 5/091 601/44 |
| 2013/0289456 | A1 * | 10/2013 | Chang Guo | A61H 9/0078 601/149 |
| 2013/0331749 | A1 | 12/2013 | Borden et al. | |
| 2014/0276271 | A1 * | 9/2014 | Stryker | A61H 23/04 601/107 |
| 2016/0113839 | A1 * | 4/2016 | Mitchell | A61H 23/006 601/96 |
| 2019/0142686 | A1 | 5/2019 | Lee | |

FOREIGN PATENT DOCUMENTS

| | | | | |
|---|---|---|---|---|
| EP | 2803346 | A1 | 11/2014 | |
| WO | WO-9317650 | A1 * | 9/1993 | A61H 9/0078 |
| WO | 2007106804 | A2 | 9/2007 | |
| WO | 2011107860 | A1 | 9/2011 | |

* cited by examiner

MOBILE HIGH FREQUENCY CHEST WALL OSCILLATION SYSTEM HAVING AIR PODS

CROSS-REFERENCE TO RELATED APPLICATIONS

This application claims priority under 35 U.S.C. § 119 (e) to U.S. Provisional Application No. 63/393,018, filed Jul. 28, 2022, which is expressly incorporated by reference herein.

BACKGROUND

The present disclosure relates to a high frequency chest wall oscillation (HFCWO) system and, in particular, to a HFCWO system having fluid pods.

There are currently approximately 30,000 cystic fibrosis patients in the United States. Cystic fibrosis patients are typically treated using high-frequency chest wall oscillation (HFCWO). Additionally, 4.3 million patients in the United States are diagnosed with symptomatic bronchiectasis. These patients are also typically prescribed HFCWO.

HFCWO is performed using an inflatable garment that is attached to an air pulse generator through air hoses. The HFCWO system mechanically performs chest physical therapy by vibrating at a high frequency. This is done by rapid mechanical compression of air in a fluid chamber within the air pulse generator. The compressed air is transferred to the garment through the air hoses. The garment vibrates the chest to loosen and thin mucus. At a predetermined time, the patient stops the air pulse generator and coughs or huffs.

Some known HFCWO systems include an air pulse generator (APG) that rapidly inflates and deflates the garment around the human torso. Such systems utilize a large amount of volume that requires a large air pulse control unit. These systems typically are not mobile and an adult small size HFCWO system can require approximately 24.6 liters of air for a therapy cycle. Other known systems are heavy and prohibit the patient from being mobile during use. For example voice coil actuators can contribute to approximately half of the entire weight. As the patient target is shifted to the elderly patients, there is a need to reduce the weight of HFCWO systems. In addition, some HFCWO intense therapy might be too harsh for the elderly patients.

SUMMARY

The present disclosure includes one or more of the features recited in the appended claims and/or the following features which, alone or in any combination, may comprise patentable subject matter.

According to a first aspect of the disclosed embodiments, a high-frequency chest wall oscillation (HFCWO) system includes a garment configured to be worn around a chest of a user. At least one fluid pod is housed by the garment and is configured to receive a fluid. The at least one fluid pod includes a housing. A cavity is formed by the housing. A dome is located in the cavity to reduce a volume of an air-receiving portion of the cavity.

In some embodiments of the first aspect, a blower can be configured to pressurize the fluid to generate pressurized fluid. The blower can be housed in the garment. Control circuitry can be configured to control the blower. A battery can be configured to power the control circuitry, the blower, and the fluid pulse generator. Each of the blower, the control circuitry, and the battery can be housed in the garment.

Optionally, in the first aspect at least one fluid pod pocket can be formed between an outer layer of the garment and an inner layer of the garment. The at least one fluid pod can be housed in the at least on fluid pod pocket. The at least one fluid pod pocket can be sized so that the at least one fluid pod is moveable within the at least one fluid pod pocket to adjust a position of the at least one fluid pod relative to the user's anatomy. The garment can include a back portion, a left front portion, and a right front portion. The at least one fluid pod can include a rear fluid pod located in the rear portion. A left front fluid pod can be located in the left front portion. A right front fluid pod can be located in the right front portion. The at least one fluid pod can include a plurality of fluid pods in fluid communication with a blower. One of the plurality of fluid pods can be fluidly downstream of another one of the plurality of fluid pods.

It may be desired, in the first aspect, that the garment includes an outer layer and an inner layer. The at least one fluid pod can be located between the outer layer and the inner layer. The inner layer can be configured to position against the user. A fastener of the at least one fluid pod can be located adjacent the outer layer. A moveable membrane of the at least one fluid pod can be located adjacent the inner layer. The moveable membrane of the at least one fluid pod can be configured to pulsate against the user. The moveable membrane of the at least one fluid pod can be formed from a flexible material. The dome of the at least one fluid pod can be positioned against a bottom panel of the housing. A diameter of the at least one fluid pod can be greater than a thickness of the at least one fluid pod. The fluid can be air.

According to a second aspect of the disclosed embodiments, a high-frequency chest wall oscillation (HFCWO) system includes a garment configured to be worn around a chest of a user. The garment includes a rear portion. A left front portion extends from the rear portion. A right front portion extends from the rear portion. A blower is configured to pressurize a fluid to generate pressurized fluid. The blower is housed in the rear portion of the garment. A plurality of fluid pods are in fluid communication with the fluid pulse generator. One of the plurality of fluid pods is fluidly downstream of another one of the plurality of fluid pods.

In some embodiments of the second aspect, control circuitry can be configured to control the blower. A battery can be configured to power the control circuitry, the blower, and the fluid pulse generator. Each of the blower, the control circuitry, and the battery can be housed in the garment. The plurality of fluid pods can include at least one rear fluid pod located in the rear portion. At least one left front fluid pod can be located in the left front portion. At least one right front fluid pod can be located in the right front portion. The at least one left front fluid pod can be fluidly downstream of the at least one rear fluid pod. The at least one right front fluid pod can be fluidly downstream of the at least one rear fluid pod. The at least one rear fluid pod can include a rear upper fluid pod and a rear lower fluid pod. The rear upper fluid pod can be fluidly downstream of the rear lower fluid pod. The at least one left front fluid pod can include a left front upper fluid pod and a left front lower fluid pod. The left front upper fluid pod can be fluidly downstream of the left front lower fluid pod. The at least one right front fluid pod can include a right front upper fluid pod and a right front lower fluid pod. The right front upper fluid pod can be fluidly downstream of the right front lower fluid pod.

Optionally, in the second aspect, the plurality of fluid pods can include an upper fluid pod and a lower fluid pod. The flow of pressurized fluid to the upper fluid pod can be configured to be deactivated. The plurality of fluid pods can be filled to a predetermined fluid pressure. A plurality of fluid pod pockets can be formed between an outer layer of the garment and an inner layer of the garment. Each of the plurality of fluid pods can be housed in one of the plurality fluid pod pockets. Each of the plurality of fluid pod pockets can be sized so that the respective fluid pod is moveable within the respective fluid pod pocket to adjust a position of the respective fluid pod relative to the user's anatomy. The fluid pulse generator can be configured to pulsate the pressurize fluid to pulsate the plurality of fluid pods. Each of the plurality of fluid pods can include a moveable membrane configured to be pulsated by the pressurized fluid. Each of the plurality of fluid pods can include an internal dome located in the cavity to reduce a volume of an air-receiving portion of the cavity. The fluid can be air.

Additional features, which alone or in combination with any other feature(s), such as those listed above and/or those listed in the claims, can comprise patentable subject matter and will become apparent to those skilled in the art upon consideration of the following detailed description of various embodiments exemplifying the best mode of carrying out the embodiments as presently perceived.

BRIEF DESCRIPTION OF THE DRAWINGS

The detailed description particularly refers to the accompanying figures in which.

DETAILED DESCRIPTION

The disclosed HFCWO device 10 aids patients in the removal of retained secretions. The device 10 utilizes high frequency chest wall oscillation technology to dislodge mucus from the bronchial walls. The device 10 also mobilizes secretions and mucus from the smaller to larger airways where it can be cleared by coughing. The device 10 is lighter than known devices and more comfortable to meet the needs for the bronchiectasis patient population, primarily the elderly aged 60 years and above. Typically, the mucus of bronchiectasis patients has a lower viscosity than that of the cystic fibrosis patients. Accordingly bronchiectasis patients may not require high intensity and frequency. Additionally, bronchiectasis patients are generally elderly females who may prefer lower settings on a HFCWO device for better comfort. Moreover, bronchiectasis most commonly affects the lower lobe of the patient's lungs. It will be appreciated that the device 10 can be used to treat cystic fibrosis and other respiratory diseases.

The device 10 includes eight fluid pods to provide vibrations on the patient's chest wall. In an exemplary embodiment, the fluid is air; however, other fluids can be contemplated. The fluid pods described herein include small pockets of fluid that can provide a focused area of vibration on the upper lobes and lower lobes of the patient's lungs. The fluid pods can be inflated by a small blower and mini fluid pulse generator powered by a small lithium-ion battery. The mini fluid pulse generator is useable because the volume of the fluids pods is significantly smaller than known HFCWO devices. On powering up, the blower fills the fluid pulse generator and the fluid pods to a predetermined air pressure. Upon starting the therapy, the fluid pulse generator generates pulsation to the frequency setting. Using fluid pods instead of voice coil actuators allow the device to be lighter. The fluid pods can also provide a more comfortable and gentler therapy than known HFCWO devices.

Figure 1:
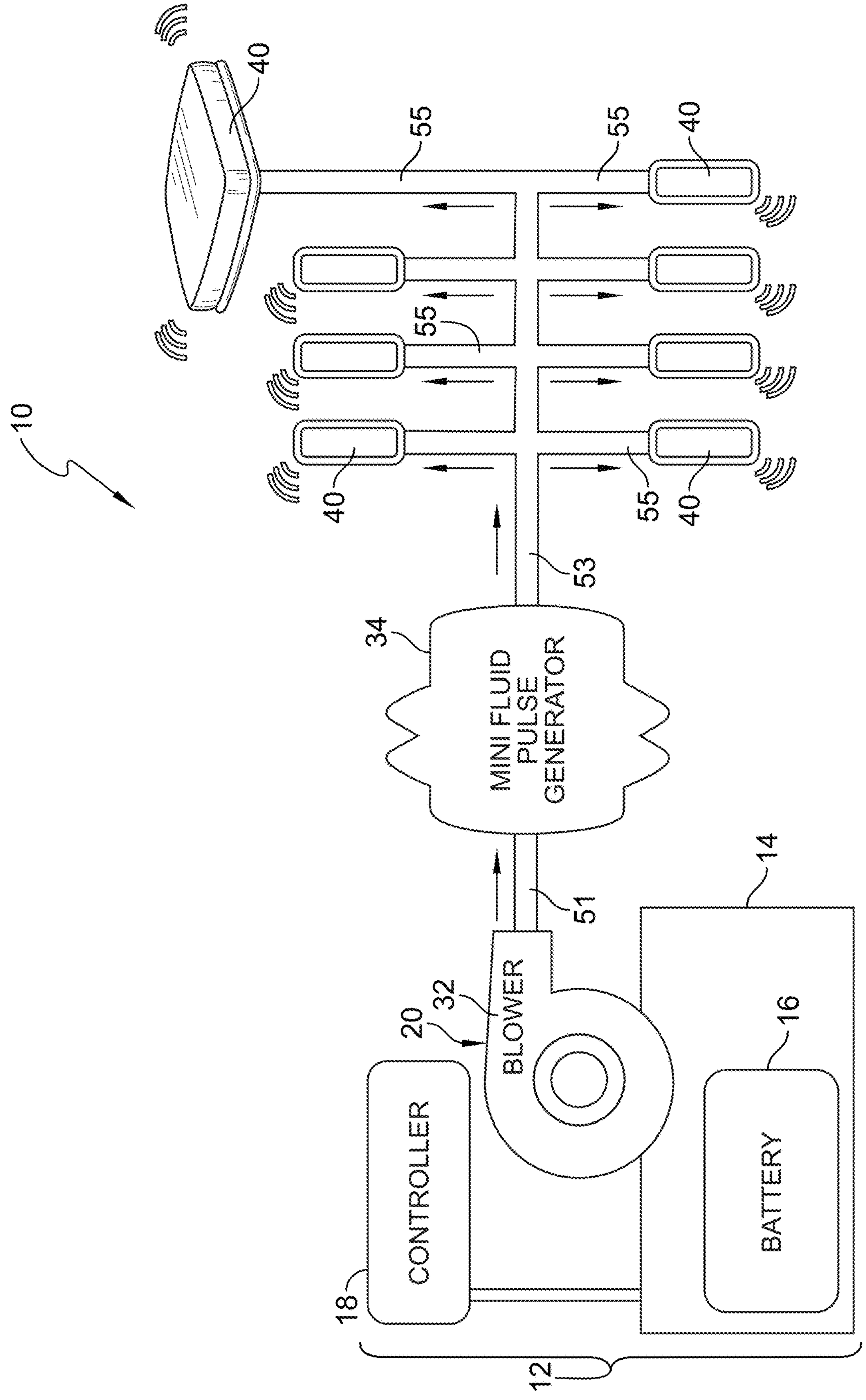
FIG. 1 is a schematic view of a high-frequency chest wall oscillation (HFCWO) system formed in accordance with an embodiment.

Referring to FIG. 1, the device 10 includes control circuitry 12 having a main board 14. A battery 16 is electronically coupled to the main board 14 to power the device 10. The battery 16 can be a rechargeable lithium-ion battery. Other types of batteries can be contemplated. A controller 18 enables a user to control the device 10. The controller 18 enables the user to activate the device 10 and alter the settings of the device 10. For example, a frequency and an intensity of the device 10 can be altered with the controller 18. The blower 32 pressurizes a fluid, for example air, to generate a pressurized fluid. The controller 18 enables the user to alter a speed of the blower 32 so that a pressure of the pressurized fluid can be altered. The blower 32 is also configured to fill a plurality of fluid pods 40 to a predetermined pressure. In the embodiment illustrated in FIG. 1, the fluid pods 40 are square and measure approximately square 150 mm by 150 mm by 15 mm. It will be appreciated that the square fluid pods 40 shown in FIG. 1 can be replaced with fluid pods 100 shown in FIG. 3. The fluid system 20 also includes a fluid pulse generator 34 that is also filled to the predetermined pressure by the blower 32. The fluid pulse generator 34 is coupled to the blower 32 by a hose [50] 51. A hose 53 extends from the fluid pulse generator 34 to a plurality of hoses [54] 55 that extend to and are in fluid communication with the fluid pods 40. The fluid pulse generator 34 is configured to pulsate the pressurized fluid in the fluid pods 40 at a predetermined frequency and intensity. In an exemplary embodiment, all of the components illustrated in FIG. 1 are sized and shaped to be housed in a garment worn by a patient as described below.

Figure 2:
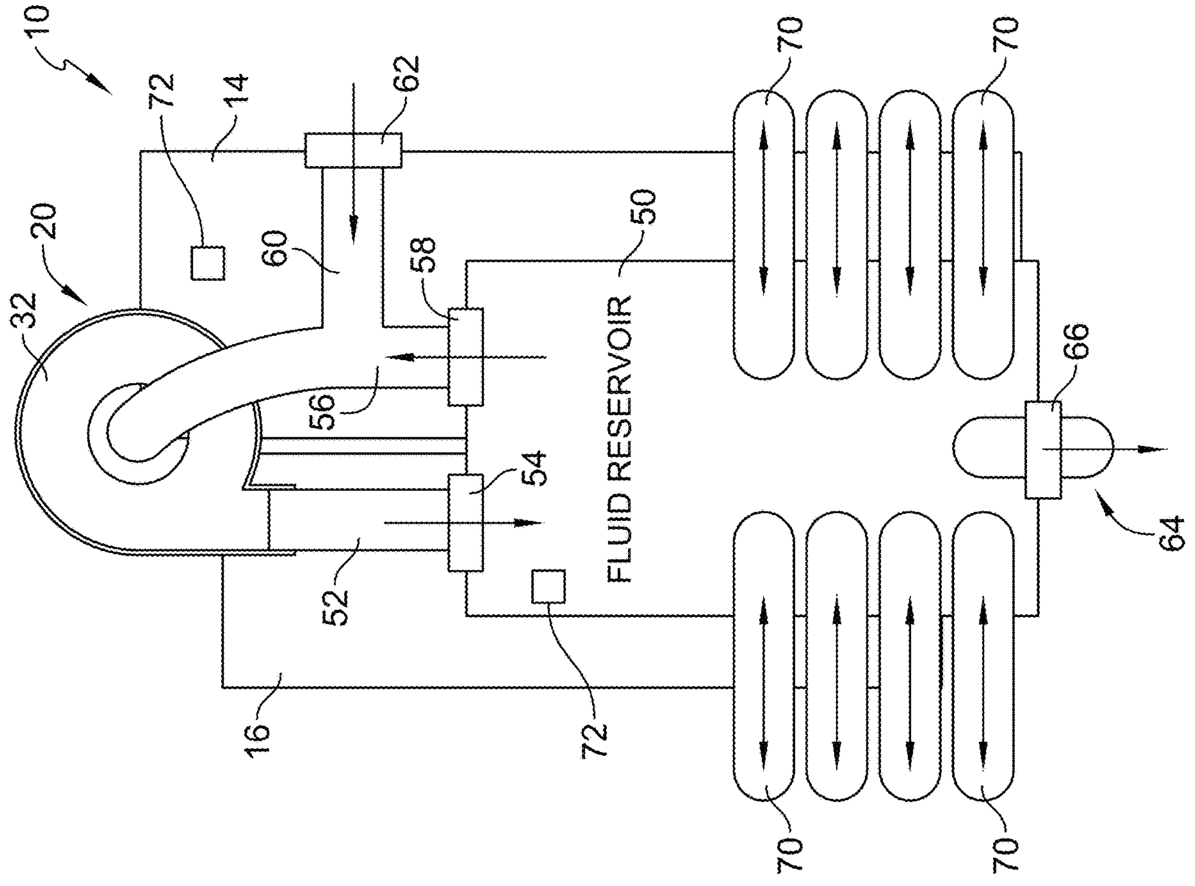
FIG. 2 is a schematic view of a blower system for the system shown in FIG. 1, wherein the blower system is configured to be housed in a garment.

FIG. 2 illustrates an embodiment of the device 10, wherein the fluid system 20 further includes a fluid reservoir 50 fluidly coupled to the fluid pods 40 with hoses 52. The fluid reservoir 50 is sized and shaped to be housed in a garment worn by a patient as described below. An outlet 52 of the blower 32 is separated from the fluid reservoir 50 by a solenoid valve 54. The solenoid valve 54 opens to discharge fluid from the blower 32 into the fluid reservoir 50. The valve 54 controls the pressure, flow rate, and frequency of the fluid in the system 10. An inlet 56 of the blower 32 is separated from the fluid reservoir 50 by a solenoid valve 58. The solenoid valve 58 opens to extract fluid from the fluid reservoir 50 back into the blower 32. A fluid intake 60 is also in fluid communication with the inlet 56 and includes a valve 62 that regulates fluid flow in and out of the system 10. An air outlet 64 includes a valve 66 that opens to allow a quick release of fluid out of the system 10. The valve 66 also regulates a pressure inside of the system. The valves described herein can be controlled by the controller 18 to provide a predetermined pressure of the fluid and a predetermined frequency and intensity of fluid pulses.

Accordingly, the blower 32 supplies and extracts fluid to and from the fluid reservoir 50. The solenoid valves 54 and 58 control the fluid flow in and out of the fluid reservoir 50. The fluid reservoir 50 distributes the fluid to the fluid pods 40 through the hoses 70. The fluid is distributed to the fluid pods 40 at a predetermined pressures, frequency, and intensity to pulsate the fluid pods against a chest of the patient, thereby loosening mucus in the patient's lungs. Any one of the hoses 70 can be sealed when not in use. Sensors 72 can be used to provide feedback to the controller 18 regarding pressure and temperature of the fluid.

Figure 3:
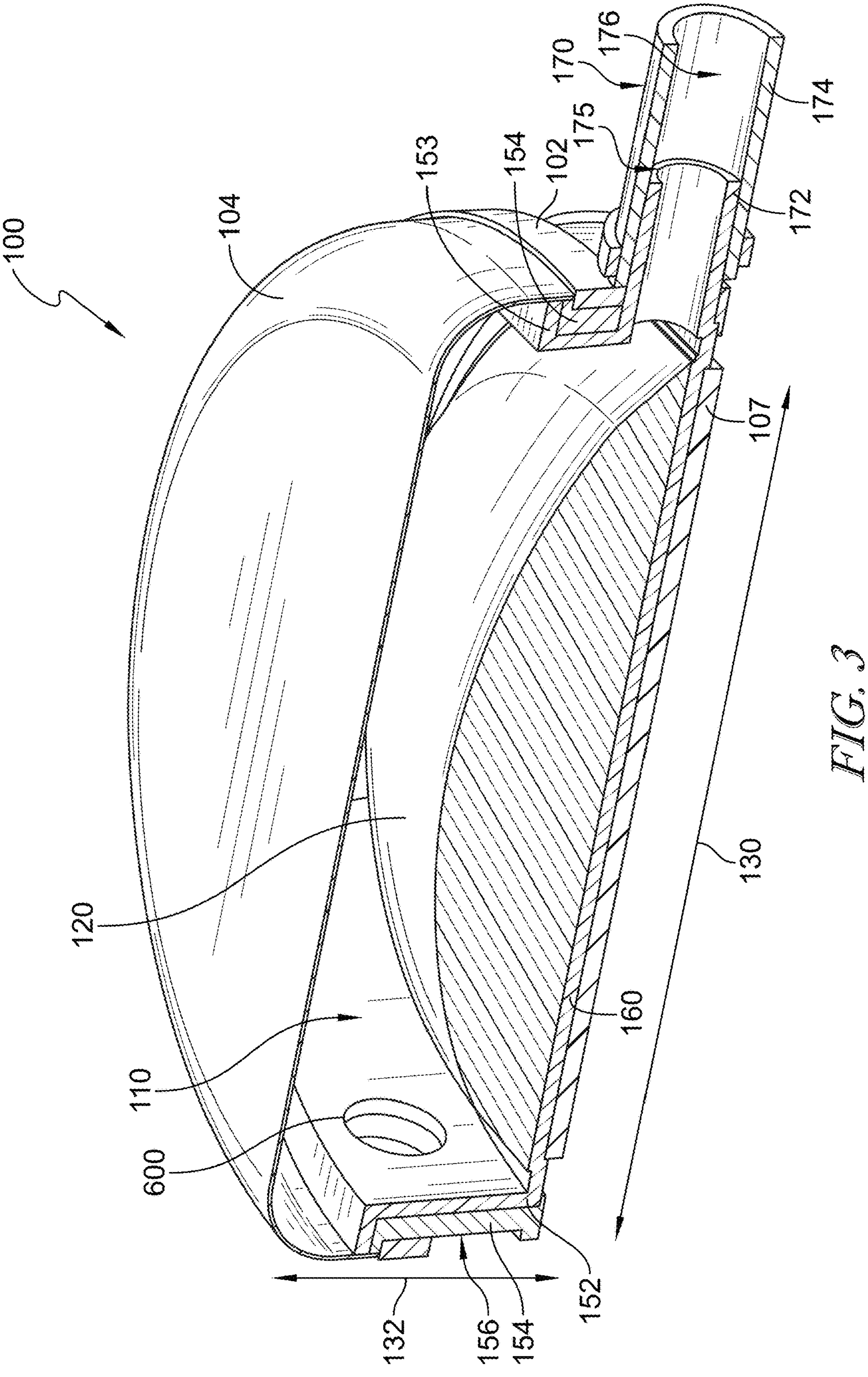
FIG. 3 is a side perspective cross-sectional view of a fluid pod configured for the system shown in FIG. 1.

Referring to FIG. 3, a fluid pod 100 can be used with the device 10 shown in FIGS. 1 and 2. A diameter 130 of the fluid pod 100 can be greater than a thickness 132 of the fluid pod 100. For example, in an exemplary embodiment, the diameter 130 of the fluid pod 100 is 103 mm and the thickness 132 of the fluid pod 100 is 25 mm. In other embodiments, the fluid pod 100 has any suitable dimensions. A plurality of fluid pods 100 are configured to be housed in a garment as described below and receive fluid from the fluid system 20. Each fluid pod 100 includes a housing 152. In the exemplary embodiment, the housing 152 is a cylindrical ring. It will be appreciated that the housing 152 can be formed in other shapes.

Figure 4:
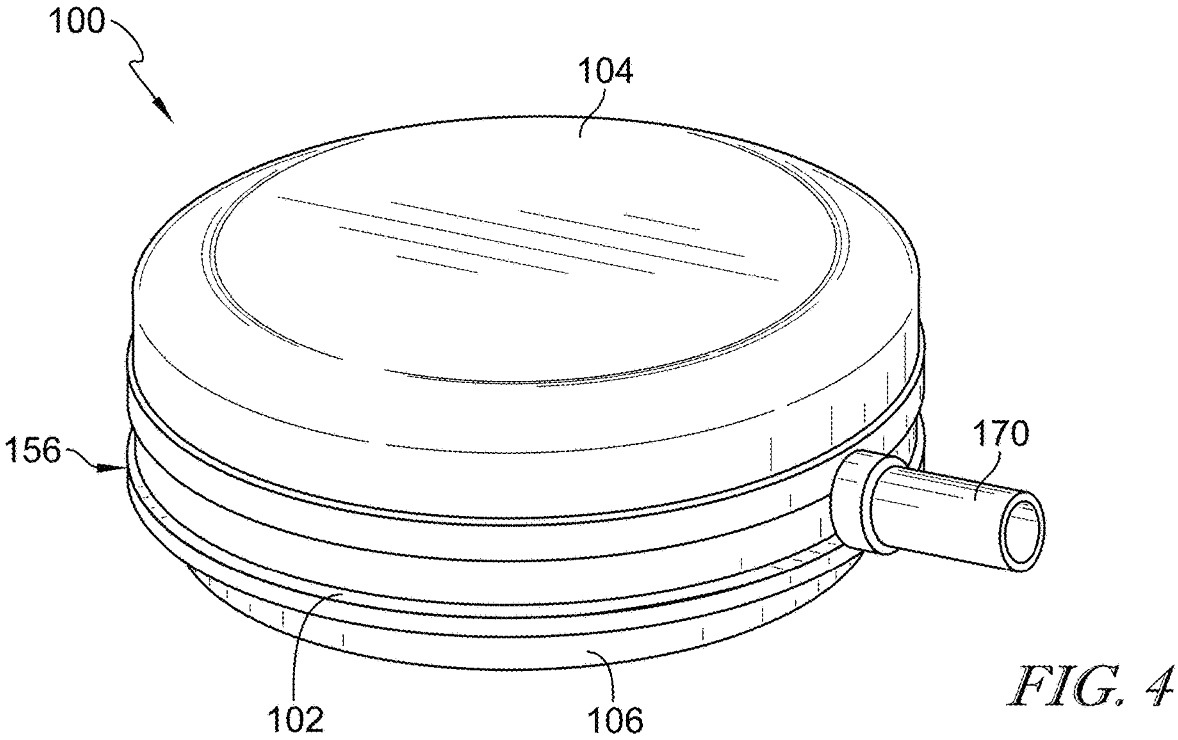
FIG. 4 is a side elevation view of the fluid pod shown in FIG. 3 in a rest configuration.
Figure 5:
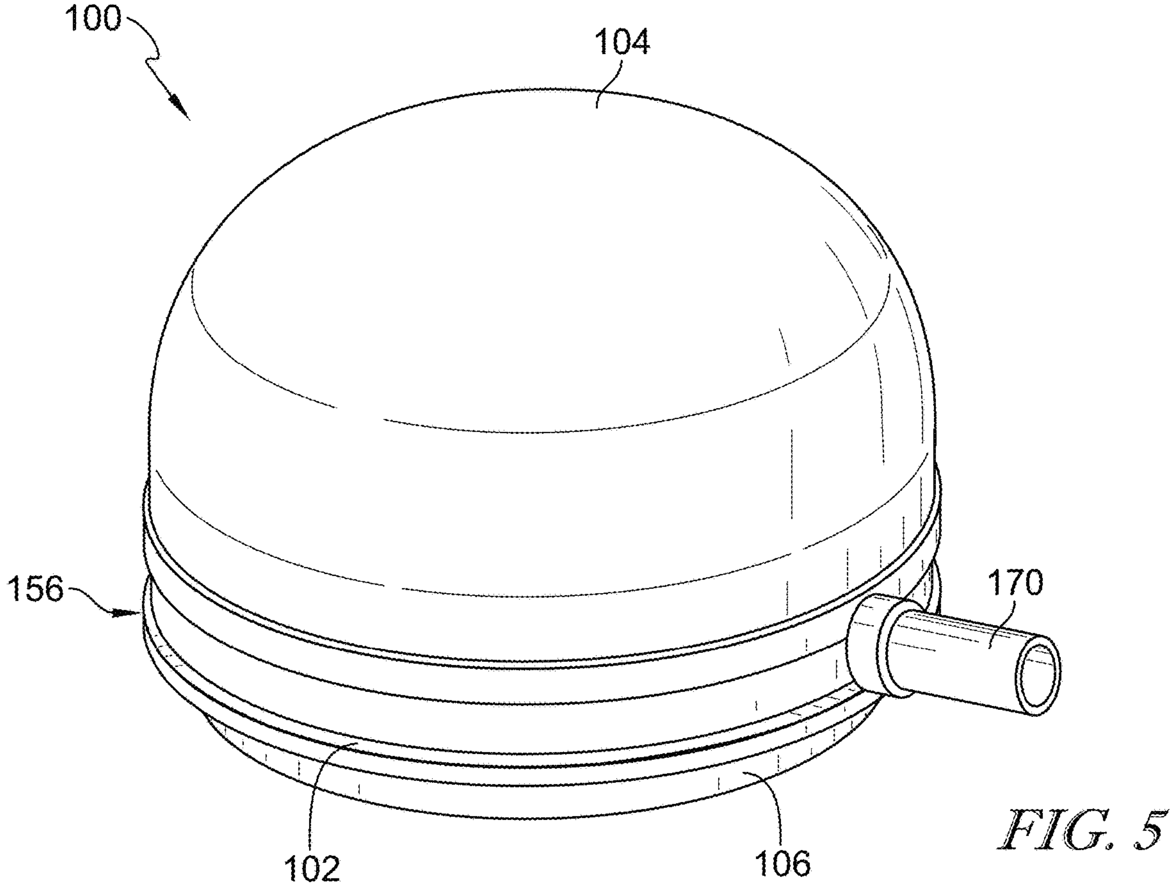
FIG. 5 is a side elevation view of the fluid pod shown in FIG. 3 in an inflated configuration.

A flange 154 is positioned along the housing 152. The flange 154 includes a groove 156 that retains the fluid pod 100 and allows the fluid pod 100 to be moved in a fluid pod pocket 250, as described below. The housing 152 is formed integrally with a bottom panel 160 that extends along a bottom of the fluid pod 100. A moveable membrane 104 is coupled to the housing 152 with a clamp 102. The moveable membrane 104 can be formed from a flexible material, for example silicone. The moveable membrane 104 is configured to be pulsated by the fluid system 20. The moveable membrane 104 moves between a rest position, wherein the moveable membrane 104 is deflated, as shown in FIG. 4, and an expanded position, as shown in FIG. 5. The moveable membrane 104 is configured to be located adjacent an inner layer of the garment, as described below. The moveable membrane 104 is configured to pulsate against the patient when the garment is worn by the patient. In some embodiments, the housing 152 includes a flexible material configured to be pulsated between the rest position and the expanded position.

A hook and loop fastener 106 is coupled to the housing 152 and extends along the bottom panel 160 so that the fluid pod 100 can be maintained in position within a fluid pod pocket 250, as described below. The cavity 110 includes an air-receiving portion 112. The housing 152 includes an inlet 170 that is in fluid communication with the air-receiving portion 112 of the cavity 110. An inner tube 172 of the inlet 170 is formed integrally with the inner ring 153. An outer tube 174 extends around the inner tube 172 and forms a groove 175 at an end 176 of the inlet 170. A hose [154] can be configured to be positioned in the groove 174. Alternatively, a hose can be positioned over the outer tube 174.

A dome 120 is located in the cavity 110 and positioned against the backing plate 106. The dome 120 can be formed from polystyrene foam. Fluid entering the cavity 110 of the fluid pod 100 fills the cavity 110 between the dome 120 and the moveable membrane 104 to pulsate the moveable membrane 104. The dome 120 reduces a volume of the air-receiving portion 112 of the cavity 110 and optimizes an inflation pressure of the moveable membrane 104. An additional port 600 extends from the housing 152 so that additional fluid pods 100 can be coupled downstream of any fluid pod 100, as described below. The additional port 600 can be sealed when not in use.

Figure 6:
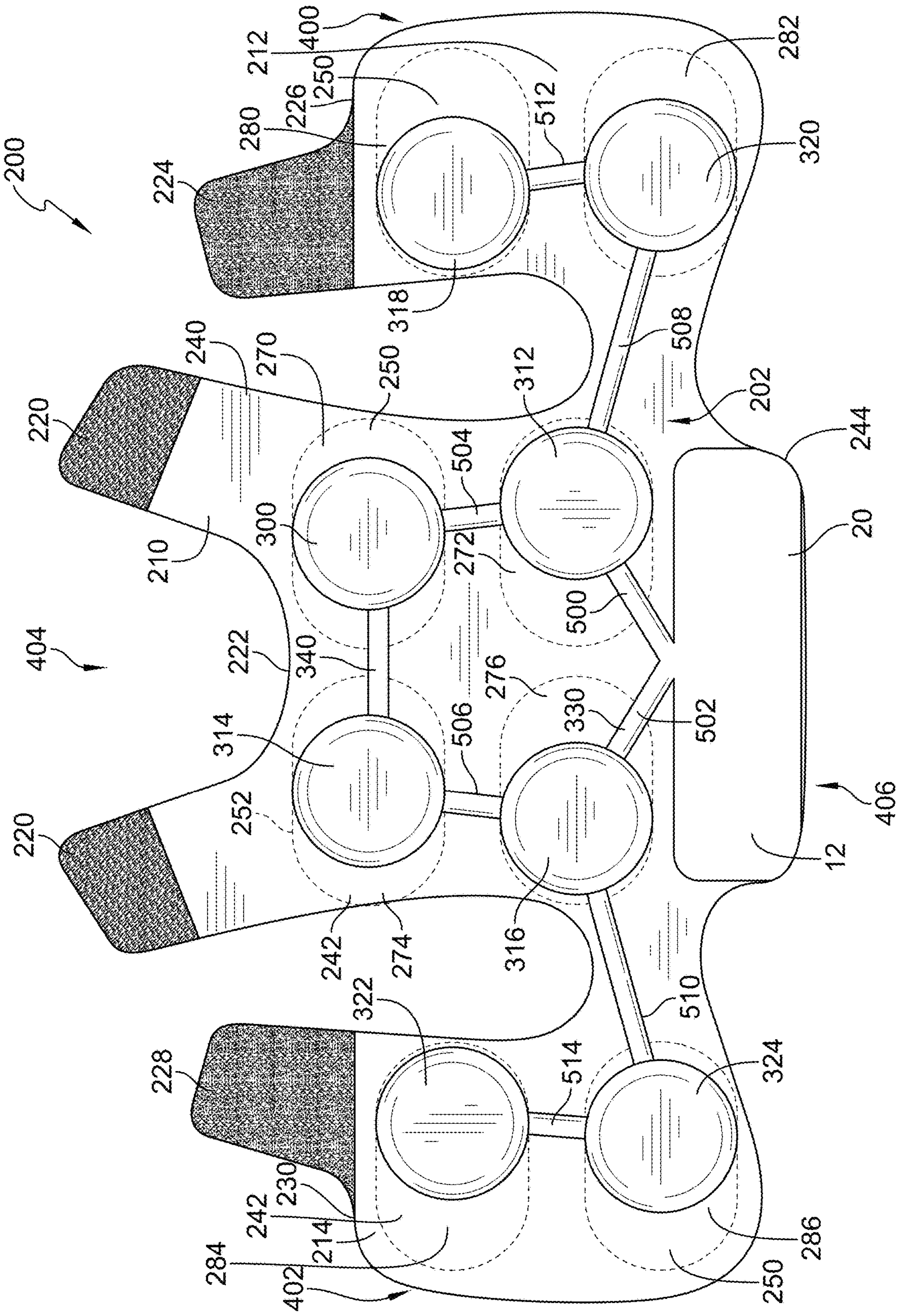
FIG. 6 is front elevation view of a garment configured for the system shown in FIG. 1 and formed in accordance with an embodiment.

Referring to FIG. 6 a garment 200 can be configured for use with the device shown in both FIG. 1 and FIG. 2. The garment 200 is configured to be worn around a chest of a user (not shown). FIG. 6 illustrates a front view of the garment 200 or an interior side 202 of the garment 200. It will be appreciated that an opposite exterior side (not shown) of the garment 200 is configured to positioned against the user. The garment 200 includes a rear portion 210. A left front portion 212 extends from the rear portion 210. A right front portion 214 also extends from the rear portion 210. The rear portion 210 is configured to position against a back of the user. The left front portion 212 and the right front portion 214 are configured to wrap around the user and position against the chest of the user. A pair of rear flaps 220 extend from a top 222 of the rear portion 210. A left flap 224 extends from a top 226 of the left front portion 212. A right flap 228 extends from a top 230 of the right front portion 214. With the left front portion 212 and the right front portion 214 are wrapped around the user, the rear flaps 220 each adjustably attach to one of the left flap 224 and the right flap 228 to secure the garment 200 on the user. The rear flaps 220, the left flap 224, and the right flap 228 can include fastening mechanisms to secure to one another. For example, the fastening mechanisms can be hook and loop fasteners. In other embodiments, the fastening mechanisms can be snaps, buckles, or the like. The garment 200 has a left boundary 400, a right boundary 402, a top boundary 404, and a bottom boundary 406.

Figure 11:
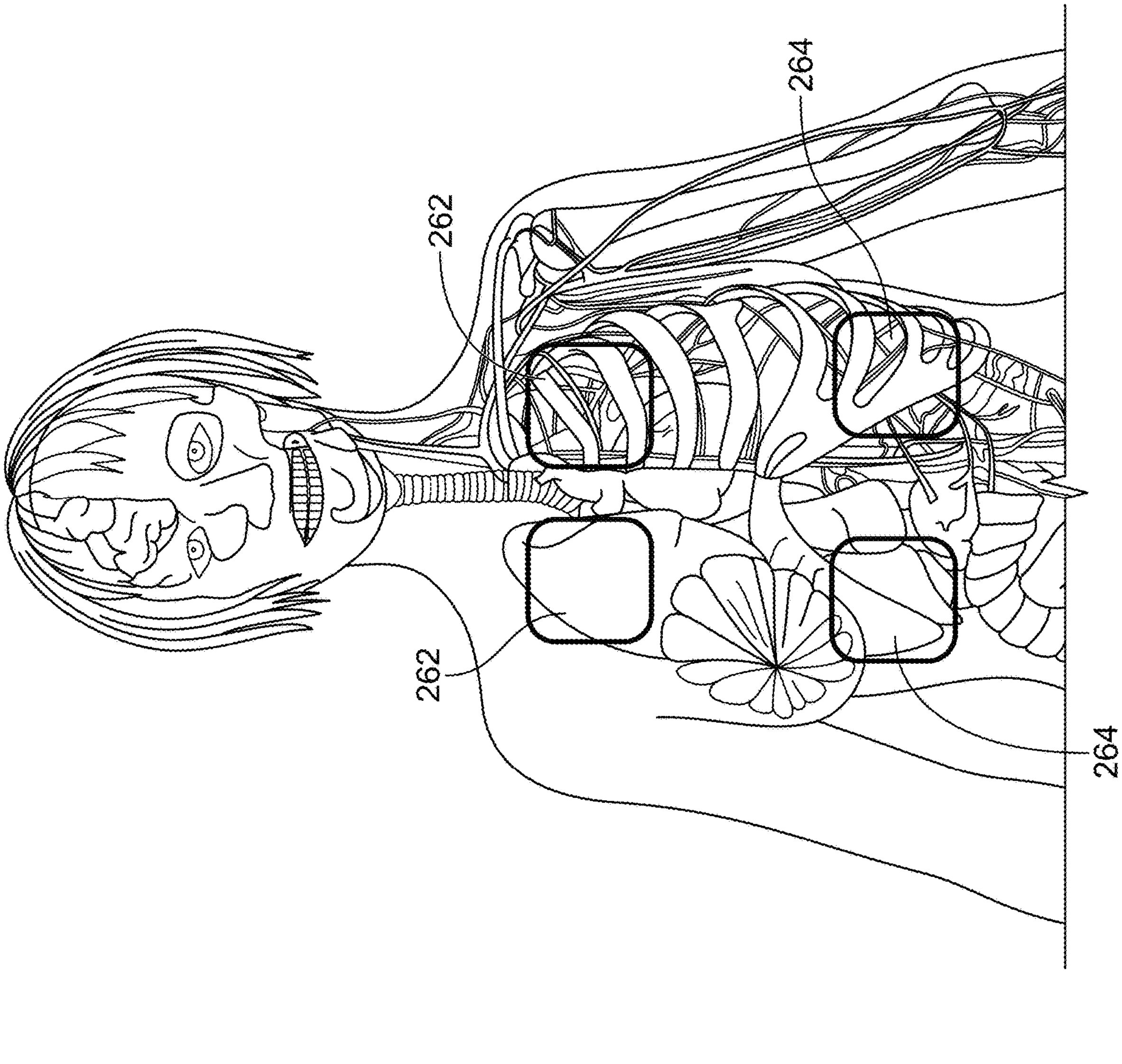
FIG. 11 is a front view of target vibration zones for the garments described herein.

The garment 200 includes an outer layer 240 and an inner layer 242 (indicated by the dashed lines). The inner layer 242 is configured to position against the user. The control circuitry 12 and the fluid system 20 are positioned adjacent a bottom 244 of the rear portion 210. The control circuitry 12 and the fluid system 20 are housed between the inner layer 242 and the outer layer 240. Throughout the garment 200, the inner layer 242 and the outer layer 240 form fluid pod pockets 250 that house individual fluid pods 100. Each fluid pod pocket 250 is sized so that the respective fluid pod 100 is moveable within the fluid pod pocket 250 to adjust a position of the fluid pod 100 relative to the user's anatomy. That is, an edge 252 of the fluid pod pocket 250 positions within the groove 156 of the fluid pod 100 to hold the fluid pod 100 and allow the fluid pod 100 to move back and forth in the fluid pod pocket 250. The fluid pod 100 is fixed in place in the fluid pod pocket 250 by a hook and loop fastener that couples to the fastener 106. The fluid pod pockets 250 are each arranged horizontally and allow for horizontal movement of the respective fluid pod 100. In the illustrative embodiment, the fluid pockets 250 prevent vertical movement of the fluid pods 100. For example, FIG. 11 illustrates target vibration zones 260 for the female anatomy, wherein upper target vibration zones 262 are positioned above the female's breasts and lower target vibration zones 264 are positioned below the female's breasts. In one embodiment, all of the fluid pockets 250 have substantially the same size and dimensions.

The fluid pod pockets 250 include an upper left rear fluid pod pocket 270, a lower left rear fluid pod pocket 272, an upper right rear fluid pod pocket 274, and a lower right rear fluid pod pocket 276 in the rear portion 210 of the garment 200. The fluid pod pockets 250 also include an upper left front fluid pod pocket 280 and a lower left front fluid pod pocket 282 in the left front portion 212 of the garment 200. An upper right front fluid pod pocket 284 and a lower right front fluid pod pocket 286 are positioned in the right front portion 214 of the garment 200.

A plurality of fluid pods 100 are positioned in respective fluid pod pockets 250 and in fluid communication with the blower 32 and the fluid pulse generator 34. An upper left rear fluid pod 300 is positioned in the upper left rear fluid pod pocket 270, and a lower left rear fluid pod 312 is positioned in the lower left rear fluid pod pocket 272 in the rear portion 210 of the garment 200. An upper right rear fluid pod 314 is positioned in the upper right rear fluid pod pocket 274, and a lower right rear fluid pod 316 is positioned in the lower right rear fluid pod pocket 276 in the rear portion 210 of the garment 200. An upper left front fluid pod 318 is positioned in the upper left front fluid pod pocket 280, and a lower left front fluid pod 320 is positioned in the lower left front fluid pod pocket 282 in the left front portion 212 of the garment 200. An upper right front fluid pod 322 is positioned in the upper right front fluid pod pocket 284, and a lower right front fluid pod 324 is positioned in the lower right front fluid pod pocket 286 in the right front portion 214 of the garment 200.

The fluid pods 100 are positioned in the respective fluid pod pocket 250 so that the backing plate 106 of the fluid pod 100 is located adjacent the outer layer 240 and the moveable membrane 104 of the fluid pod 100 is located adjacent the inner layer 242. The fluid pods 100 are positioned in the respective fluid pod pocket 250 so fluid pods 100 can be positioned at predetermined spots for targeted therapy to improve efficacy. For example, a position of each individual fluid pod 100 can be adjusted or moved within the pocket 250 to better match a patient's body shape. The plurality of fluid pods 100 are configured to be filled to a predetermined fluid pressure before therapy. In some embodiments, any one of selected individual fluid pods 100 on the upper lobes of the patient's chest can be de-activated when necessary. For example, the upper left rear fluid pod 300, the upper right rear fluid pod 314, the upper left front fluid pod 318, and/or the upper right front fluid pod 322 can be de-activated when necessary.

A plurality of hoses 330 connect each of the fluid pods 100 to the fluid pulse generator 34. Some fluid pods 100 are coupled directly to the fluid pulse generator 34 by a hose 330. Other fluid pods 100 are positioned downstream of another fluid pod 100 and coupled by a hose 330. In an exemplary embodiment, the hose 330 has an internal diameter of 10 mm. In the embodiment shown in FIG. 6, the lower left rear fluid pod 312 and the lower right rear fluid pod 316 are both coupled directly to the device 10 by respective hoses 500, 502 that extend outward along the bottom boundary 406 toward the left boundary 400 and the right boundary 402, respectively. The upper left rear fluid pod 300 is positioned downstream of the lower left rear fluid pod 312 and coupled by a hose 504 that extends upward toward the top boundary 404. The upper right rear fluid pod 314 is positioned downstream of the lower right rear fluid pod 316 and coupled by a hose 506 that extends upward toward the top boundary 404. The upper left rear fluid pod 300 is also in fluid communication with the upper right rear fluid pod 314 via a hose 340. The lower left front fluid pod 320 is positioned downstream of the lower left rear fluid pod 312 and coupled by a hose 508 that extends toward the left boundary 400 along the bottom boundary 406. The lower right front fluid pod 324 is positioned downstream of the lower right rear fluid pod 316 and coupled by a hose 510 that extends toward the right boundary 402 along the bottom boundary 406. The upper left front fluid pod 318 is positioned downstream of the lower left front fluid pod 320 and coupled by a hose 512 that extends upward toward the top boundary 404. Additionally, the upper right front fluid pod 322 is positioned downstream of the lower right front fluid pod 324 and coupled by a hose 514 that extends upward toward the top boundary 404.

Figure 7:
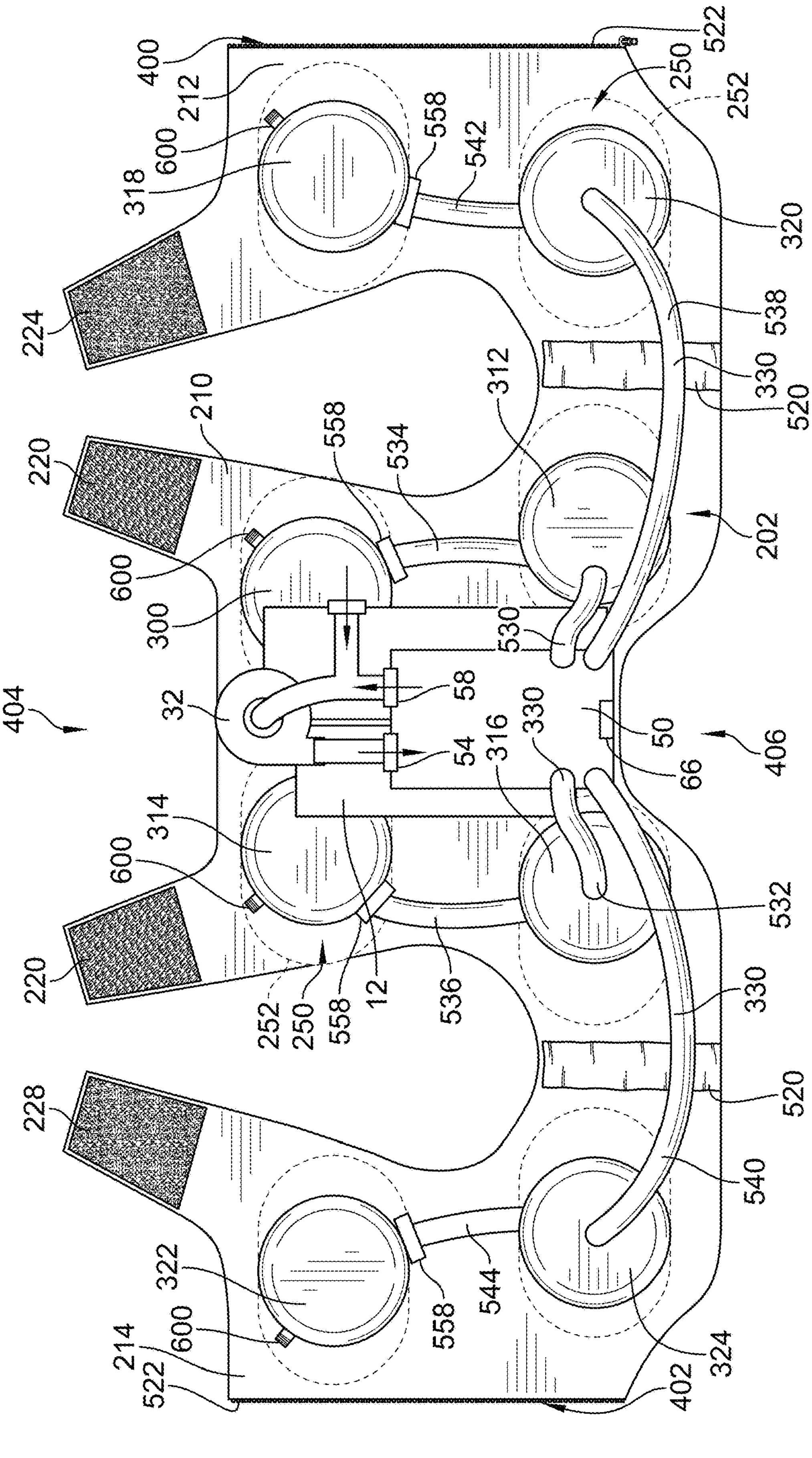
FIG. 7 is front elevation view of a garment configured for the system shown in FIG. 1 and formed in accordance with another embodiment.

FIG. 7 illustrates another configuration of the fluid pods 100, wherein the lower left rear fluid pod 312 and the lower right rear fluid pod 316 are both coupled directly to the fluid reservoir 50 by respective hoses 530, 532 that extend along the bottom boundary 406 toward the left boundary 400 and the right boundary 402, respectively. The upper left rear fluid pod 300 is positioned downstream of the lower left rear fluid pod 312 and coupled by a hose 534 that extends toward the top boundary 404. The upper right rear fluid pod 314 is positioned downstream of the lower right rear fluid pod 316 and coupled by a hose 536 that extends toward the top boundary 404. The lower left front fluid pod 320 and the lower right front fluid pod 324 are both coupled directly to the fluid reservoir 50 by respective hoses 538, 540 that extend along the bottom boundary 406 toward the left boundary 400 and the right boundary 402, respectively. The upper left front fluid pod 318 is positioned downstream of the lower left front fluid pod 320 and coupled by a hose 542 that extends toward the top boundary 404. Additionally, the upper right front fluid pod 322 is positioned downstream of the lower right front fluid pod 324 and coupled by a hose 544 that extends toward the top boundary 404.

Each of the upper left front fluid pod 318, the upper right front fluid pod 322, the upper left rear fluid pod 300, and the upper right rear fluid pod 314 include additional ports 600 to position more fluid pods 100 downstream. The ports 600 can be sealed when not in use. A solenoid valve 558 is also positioned upstream of each of the upper left front fluid pod 318, the upper right front fluid pod 322, the upper left rear fluid pod 300, and the upper right rear fluid pod 314 in the respective hose. The solenoid valves 558 are configured to shut off fluid flow to the respective upper left front fluid pod 318, upper right front fluid pod 322, upper left rear fluid pod 300, and upper right rear fluid pod 314 when the respective pod 100 is not configured to be in use.

In the configuration of FIG. 7, the garment 200 can include an elastic section 520 between the rear portion 210 and the left front portion 212 and between the rear portion 210 and the right front portion 214. The elastic section 520 enables the garment 200 to more comfortably fit on the user. It will be appreciated that the elastic section can be included in any configuration of the garment 200. The garment 200 can also include a zipper 522 or other coupling mechanism that couples the left front portion 212 to the right front portion 214. The zipper 522 can be used in any embodiment of the garment 200.

Figure 8:
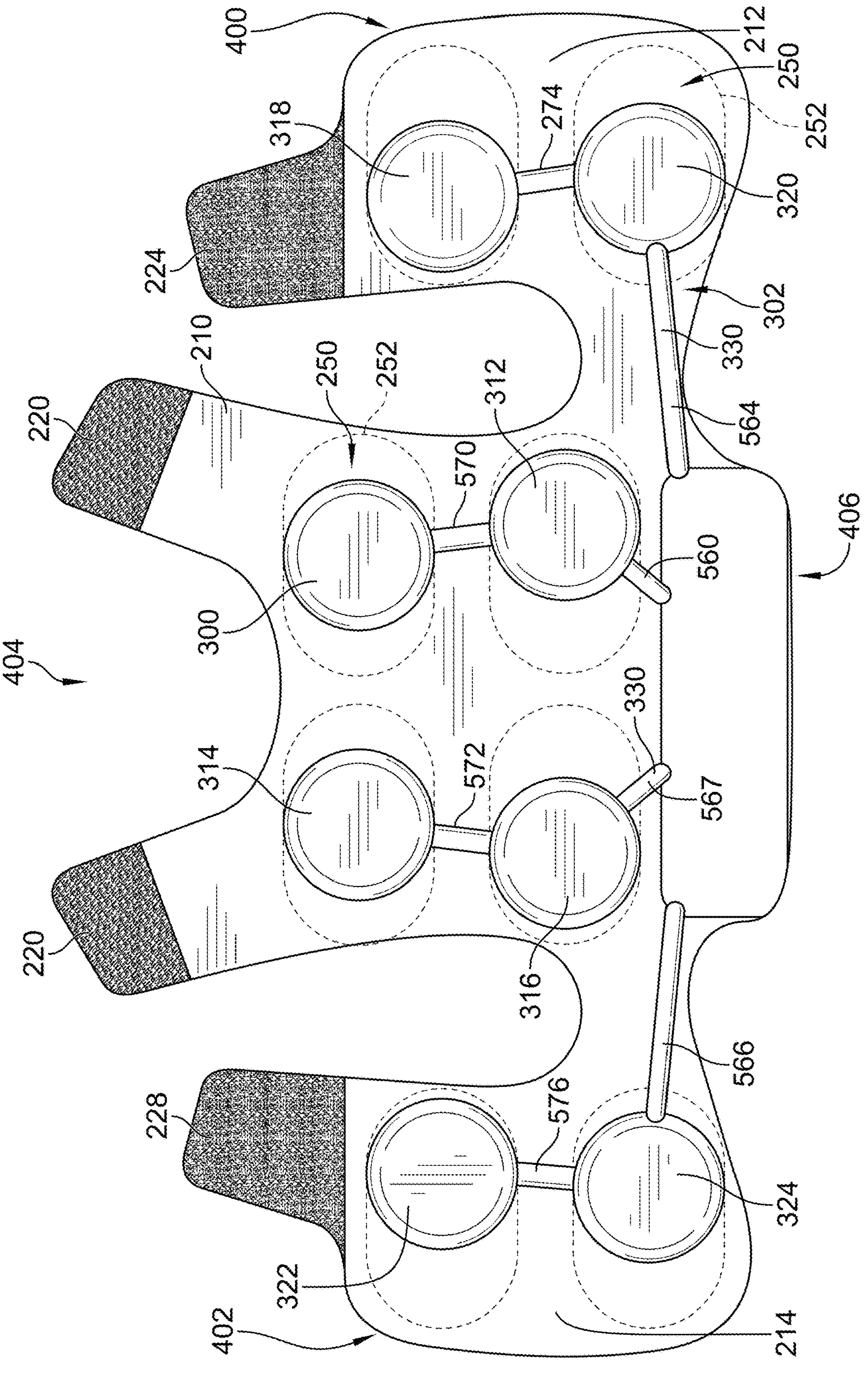
FIG. 8 is front elevation view of a garment configured for the system shown in FIG. 1 and formed in accordance with yet another embodiment.

FIG. 8 illustrates another configuration of the fluid pods 100, wherein the lower left rear fluid pod 312, the lower right rear fluid pod 316, the lower left front fluid pod 320, and the lower right front fluid pod 324 are all coupled directly to the fluid pulse generator 34 by respective hoses 330. A hose 560 extends from the fluid pulse generator 34 upward toward the top boundary 404 to the lower left rear fluid pod 312. A hose 562 extends from the fluid pulse generator 34 upward toward the top boundary 404 to the lower right rear fluid pod 316. A hose 564 extends from the fluid pulse generator 34 toward the left boundary 400 to the lower left front fluid pod 320. A hose 566 extends from the fluid pulse generator 34 toward the right boundary 402 to the lower right front fluid pod 324.

The upper left rear fluid pod 300 is positioned downstream of the lower left rear fluid pod 312 by a hose 570 that extends upward toward the top boundary 404. The upper right rear fluid pod 314 is positioned downstream of the lower right rear fluid pod 316 by a hose 572 that extends upward toward the top boundary 404. The upper left front fluid pod 318 is positioned downstream of the lower left front fluid pod 320 by a hose 574 that extends upward toward the top boundary 404. Additionally, the upper right front fluid pod 322 is positioned downstream of the lower right front fluid pod 324 by a hose 576 that extends upward toward the top boundary 404.

Figure 9:
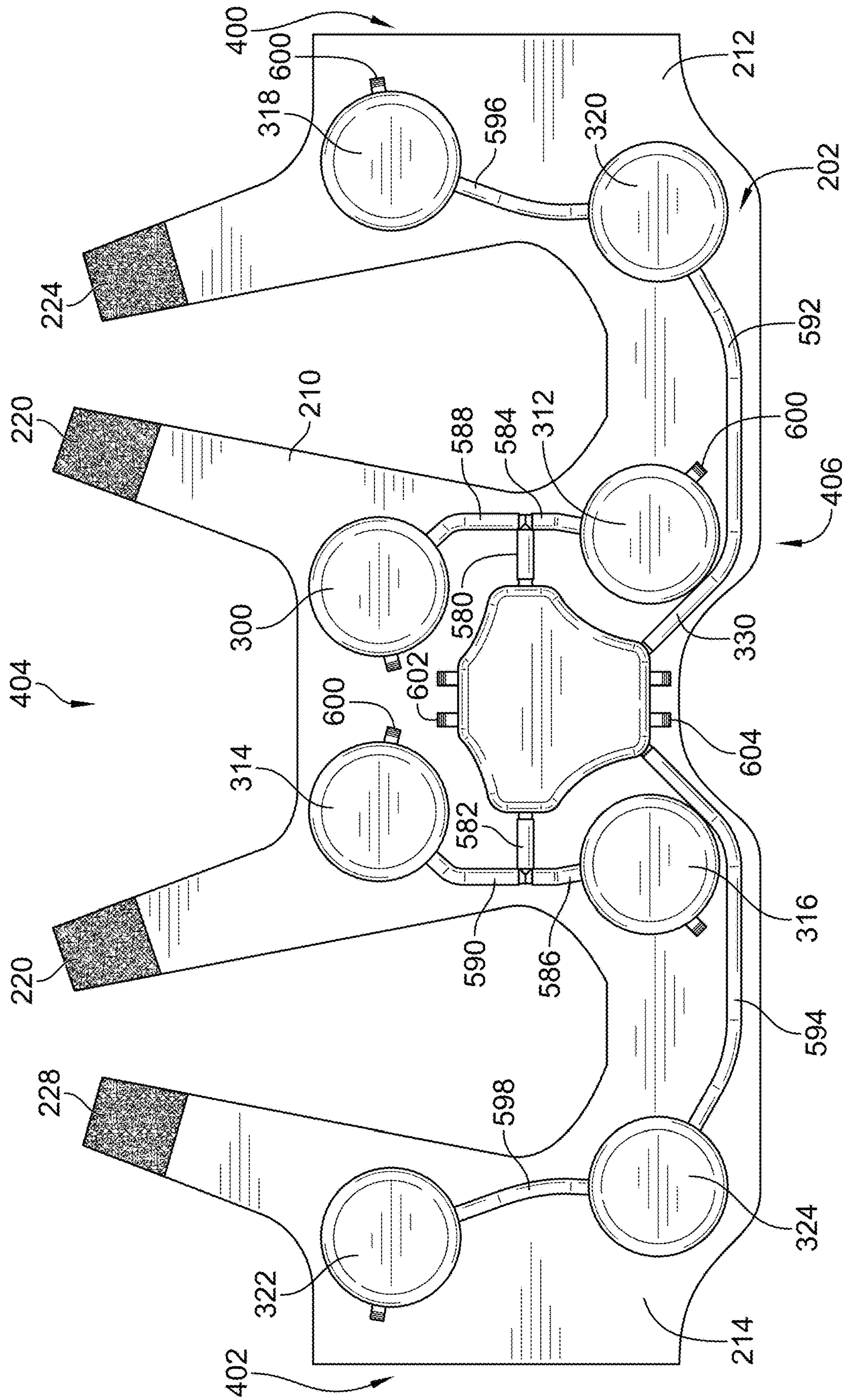
FIG. 9 is front elevation view of a garment configured for the system shown in FIG. 1 and formed in accordance with a further embodiment.

FIG. 9 illustrates another configuration of the fluid pods 100, wherein the lower left rear fluid pod 312, the lower right rear fluid pod 316, the upper left rear fluid pod 300, and the upper right rear fluid pod 314 are all coupled directly to the fluid pulse generator 34 by respective hoses 330. A left hose 580 extends from the fluid pulse generator 34 toward the left boundary 400, and a right hose 582 extends from the fluid pulse generator 34 toward the right boundary 402. The lower left rear fluid pod 312 is coupled to the left hose 580 by a hose 584 that extends downward toward the bottom boundary 406. The lower right rear fluid pod 316 is coupled to the right hose 582 by a hose 586 that extends downward toward the bottom boundary 406. The upper left rear fluid pod 300 is coupled to the left hose 580 by a hose 588 that extends upward toward the top boundary 404. The upper right rear fluid pod 314 is coupled to the right hose 582 by a hose 590 that extends upward toward the top boundary 404.

The lower left front fluid pod 320 and the lower right front fluid pod 324 are also coupled directly to the device 10 by respective hoses 330. A hose 592 extends along the bottom boundary 406 toward the left boundary 400 between the device 10 and the lower left front fluid pod 320. A hose 594 extends along the bottom boundary 406 toward the right boundary 402 between the device 10 and the lower right front fluid pod 324. The upper left front fluid pod 318 is positioned downstream of the lower left front fluid pod 320 and coupled by a hose 596 that extends upward toward the top boundary 404. Additionally, the upper right front fluid pod 322 is positioned downstream of the lower right front fluid pod 324 and coupled by a hose 598 that extends upward toward the top boundary 406.

The device 10 includes a pair of upper ports 602 and a pair of lower ports 604 to attach additional fluid pods 100. Each of the lower left rear fluid pod 312, the lower right rear fluid pod 316, the upper left rear fluid pod 300, and the upper right rear fluid pod 314 include additional ports 600 to position more fluid pods 100 downstream. The upper left front fluid pod 318 and the upper right front fluid pod 322 also include additional ports 600. The ports 600, 602, 604 can be sealed when not in use.

Figure 10:
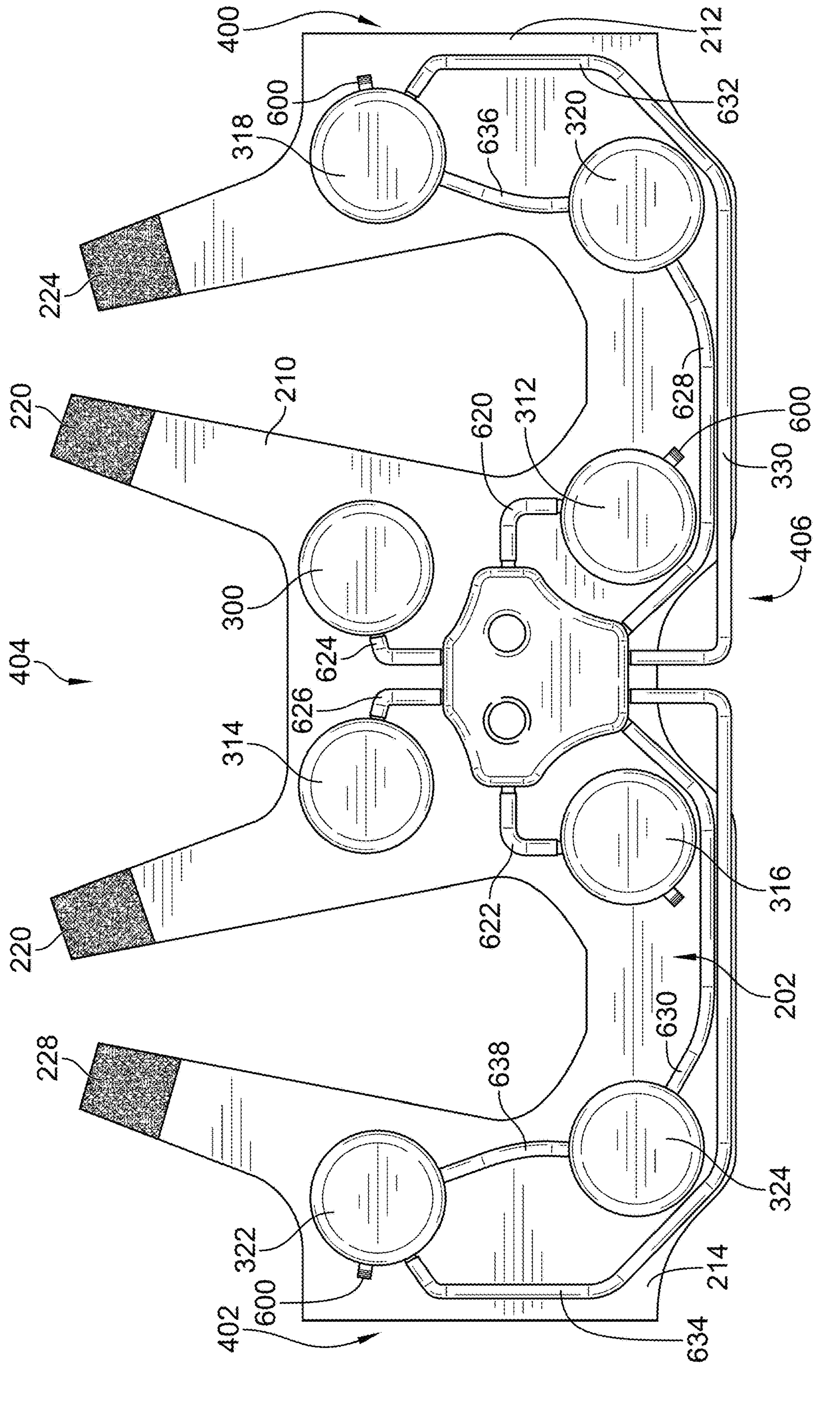
FIG. 10 is front elevation view of a garment configured for the system shown in FIG. 1 and formed in accordance with an additional embodiment.

FIG. 10 illustrates another configuration of the fluid pods 100, wherein each of the lower left rear fluid pod 312, the lower right rear fluid pod 316, the upper left rear fluid pod 300, the upper right rear fluid pod 314, the lower left front fluid pod 320, the lower right front fluid pod 324, the upper left front fluid pod 318, and the upper right front fluid pod 322 are coupled directly to the fluid pulse generator 34 by respective hoses 330. A hose 620 extends from the fluid pulse generator 34 toward the left boundary 400 and the bottom boundary 406 to the lower left rear fluid pod 312. A hose 622 extends from the fluid pulse generator 34 toward the right boundary 402 and the bottom boundary 406 to the lower right rear fluid pod 316. A hose 624 extends from the fluid pulse generator 34 toward the left boundary 400 and the top boundary 404 to the upper left rear fluid pod 300. A hose 626 extends from the fluid pulse generator 34 toward the right boundary 402 and the top boundary 404 to the upper right rear fluid pod 314. A hose 628 extends from the fluid pulse generator 34 toward the left boundary 400 to the lower left front fluid pod 320. A hose 630 extends from the fluid pulse generator 34 toward the right boundary 402 to the lower right front fluid pod 324. A hose 632 extends from the fluid pulse generator 34 toward the left boundary 400 and the top boundary 404 to the upper left front fluid pod. A hose 634 extends from the fluid pulse generator 34 toward the right boundary 402 and the top boundary 404 to the upper right front fluid pod 322. The lower left front fluid pod 320 is also coupled to the upper left front fluid pod 318 by a hose 636 that extends between the top boundary 404 and the bottom boundary 406. The lower right front fluid pod 324 is also coupled to the upper right front fluid pod 322 by a hose 638 that extends between the top boundary 404 and the bottom boundary 406. The lower left rear fluid pod 312, the lower right rear fluid pod 316, the upper left front fluid pod 318, and the upper right front fluid pod 322 also include additional ports 600 that operate as described above.

The device 10 provides a mobile vest with localized fluid pods powered by a rechargeable battery. The device 10 includes 8 individual fluid pods that can be positioned at predetermined spots for targeted therapy to facilitate improving efficacy. A position of each individual fluids pods can be adjusted to better match the patient's body shape. The smaller fluid pod volume facilitates applying a gentler therapy for patients. Additionally, the individual fluid pods on the upper lobes can be de-activated when necessary. Some advantages of utilizing the fluid pods instead of voice coil actuators is that the fluid pods have a lighter weight and reduce the bulk weight of the device. The fluid pods also require less power and provided a less intense therapy. Less body surface area coverage from the fluid pods facilitates preventing discomfort and heat buildup during therapy.

The embodiments described herein provide a lighter HFCWO device 10 in comparison to known devices. Accordingly, the device 10 is more suitable for travel and easier to get on. However, the device 10 is also provided in different sizes so that the device 10 is adaptable to all body types. The device 10 is also adaptable to female body types and people with a short waist. The device 10 is adaptable to use in any position with the patient moving around so that a patient does not have sit during use. In an exemplary embodiment, the fluid pods of the device 10 are softer and more comfortable than known devices. Additionally, the fluid pods are adaptable to the female anatomy. A target patient profile for the device 10 can include, but is not limited to, newly diagnosed patients, elderly patients, female patients, and thin patients. The device 10 is suitable for use while seated or moving around in any room and can be used multiple times per day.

Any theory, mechanism of operation, proof, or finding stated herein is meant to further enhance understanding of principles of the present disclosure and is not intended to make the present disclosure in any way dependent upon such theory, mechanism of operation, illustrative embodiment, proof, or finding. It should be understood that while the use of the word preferable, preferably or preferred in the description above indicates that the feature so described can be more desirable, it nonetheless cannot be necessary and embodiments lacking the same can be contemplated as within the scope of the disclosure, that scope being defined by the claims that follow.

In reading the claims it is intended that when words such as "a," "an," "at least one," "at least a portion" are used there is no intention to limit the claim to only one item unless specifically stated to the contrary in the claim. When the language "at least a portion" and/or "a portion" is used, the item can include a portion and/or the entire item unless specifically stated to the contrary.

It should be understood that only selected embodiments have been shown and described and that all possible alternatives, modifications, aspects, combinations, principles, variations, and equivalents that come within the spirit of the disclosure as defined herein or by any of the following claims are desired to be protected. While embodiments of the disclosure have been illustrated and described in detail in the drawings and foregoing description, the same are to be considered as illustrative and not intended to be exhaustive or to limit the disclosure to the precise forms disclosed. Additional alternatives, modifications and variations can be apparent to those skilled in the art. Also, while multiple inventive aspects and principles have been presented, they need not be utilized in combination, and many combinations of aspects and principles are possible in light of the various embodiments provided above.

The invention claimed is:

1. A high-frequency chest wall oscillation (HFCWO) system comprising:
- a garment configured to be worn around a chest of a user; and
- at least one fluid pod housed by the garment and configured to receive a fluid, the at least one fluid pod including:
  - a housing formed by a bottom panel and a movable membrane coupled to the bottom panel;
  - a cavity formed by the housing between the movable membrane and the bottom panel; and
  - a dome located in the cavity between the movable membrane and the bottom panel to retain the fluid between the moveable membrane and the dome and reduce a volume of an air-receiving portion of the cavity.

2. The system of claim 1, further comprising a blower configured to pressurize the fluid to generate pressurized fluid.

3. The system of claim 2, wherein the blower is housed in the garment.

4. The system of claim 2, further comprising:
- control circuitry configured to control the blower; and
- a battery configured to power the control circuitry, the blower, and a fluid pulse generator.

5. The system of claim 4, wherein each of the blower, the control circuitry, and the battery are housed in the garment.

6. The system of claim 1, further comprising at least one fluid pod pocket formed between an outer layer of the garment and an inner layer of the garment, wherein the at least one fluid pod is housed in the at least on fluid pod pocket.

7. The system of claim 6, wherein the at least one fluid pod pocket is sized so that the at least one fluid pod is moveable within the at least one fluid pod pocket to adjust a position of the at least one fluid pod relative to the user's anatomy.

8. The system of claim 1, wherein the garment includes:
- a rear portion;
- a left front portion; and
- a right front portion;
- wherein the at least one fluid pod includes at least one of a rear fluid pod located in the rear portion, a left front fluid pod located in the left front portion, and a right front fluid pod located in the right front portion.

9. The system of claim 1, wherein the garment includes:
- a rear portion;
- a left front portion; and
- a right front portion;
- wherein the at least one fluid pod includes at least two of a rear fluid pod located in the rear portion, a left front fluid pod located in the left front portion, and a right front fluid pod located in the right front portion.

10. The system of claim 1, wherein the garment includes:
- a rear portion;
- a left front portion; and
- a right front portion;
- wherein the at least one fluid pod includes a rear fluid pod located in the rear portion, a left front fluid pod located in the left front portion, and a right front fluid pod located in the right front portion.

11. The system of claim 1, wherein the at least one fluid pod includes a plurality of fluid pods in fluid communication with a blower.

12. The system of claim 1, wherein one of the at least one fluid pod is fluidly downstream of another one of the at least one fluid pod.

13. The system of claim 1, wherein the garment includes an outer layer and an inner layer, wherein the at least one fluid pod is located between the outer layer and the inner layer, wherein the inner layer is configured to position against the user.

14. The system of claim 13, wherein a fastener of the at least one fluid pod is located adjacent the outer layer.

15. The system of claim 13, wherein the moveable membrane of the at least one fluid pod is located adjacent the inner layer.

16. The system of claim 1, wherein the moveable membrane is configured to pulsate against the user.

17. The system of claim 1, wherein the moveable membrane is formed from a flexible material.

18. The system of claim 1, wherein the dome of the at least one fluid pod is positioned against a bottom panel of the housing.

19. The system of claim 1, wherein a diameter of the at least one fluid pod is greater than a thickness of the at least one fluid pod.

20. The system of claim 1, wherein the fluid is air.

* * * * *